United States Patent Office 3,453,270
Patented July 1, 1969

3,453,270
METHINE DYES FOR HYDROPHOSIC FIBERS
Max A. Weaver, David J. Wallace, and James M. Straley, Kingsport, Tenn., assignors to Eastman Kodak Company, Rochester, N.Y., a corporation of New Jersey
No Drawing. Filed Feb. 25, 1966, Ser. No. 529,971
Int. Cl. C09b 23/04
U.S. Cl. 260—244                                3 Claims

ABSTRACT OF THE DISCLOSURE

Compounds containing a benzomorpholine nucleus and a cyanomethylidene group are useful as dyes for hydrophobic textile materials.

---

This invention relates to novel methine compounds and, in particular, to novel methine dyes useful for dyeing natural and synethetic textile fibers, yarns and fabrics.

The novel methine dyes of the invention are characterized by the general formula

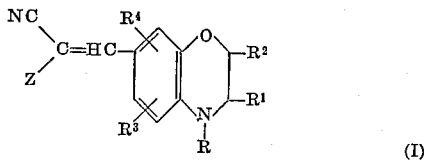

(I)

wherein
R represents lower alkyl, e.g. methyl or substituted alkyl such as haloalkyl, e.g. chloroethyl, cyanoalkyl, e.g. cyanoethyl, lower alkoxyalkyl, e.g. methoxyethyl, arylcarbamoyloxy, e.g. phenylcarbamoyloxy, lower alkylcarbamoyloxy, e.g. butylcarbamoyloxy, alkoxyacylurethanyl, e.g. ethoxyacetylurethanyl, lower alkanoyloxyalkyl, e.g. acetoxyethyl, aryluridoalkyl, e.g. phenylureidoethyl, lower alkanoylamidoalkyl, e.g. acetamidoethyl, dicarboxylic acid imidoalkyl, e.g. succinimidoethyl, lower alkylsulfonamidoalkyl, e.g. methylsulfonamidoethyl and the like; $R^1$ represents hydrogen; lower alkyl, e.g. methyl; substituted alkyl, e.g. haloalkyl and the like; aryl, e.g. phenyl; substituted phenyl, e.g. lower alkylphenyl and the like; $R^2$ represents hydrogen or lower alkyl, e.g. methyl; $R^3$ and $R^4$ represent the same or different substituents such as hydrogen; lower alkyl, e.g. methyl; halogeno, e.g. chloro; lower alkoxy, e.g. methoxy; lower alkanoylamido, e.g. acetamido and the like; and
Z represents cyano, —COOCH$_2$CH$_2$CN, lower —COO-alkyl, lower —CON(alkyl)$_2$ or —CONH$_2$, such radicals being derived from a lower saturated aliphatic dicarboxylic acid, e.g. malonic, succinic, glutaric and the like.

In general, the novel methine dyes of the invention are prepared by:

(a) hydrogenation and cyclization of a compound having the formula

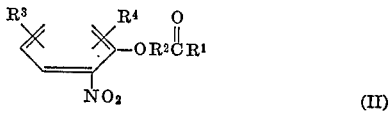

(II)

to obtain the appropriate benzomorpholine having the formula

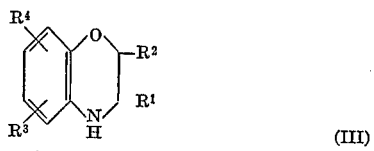

(III)

(b) reacting (III) with appropriate reagents to obtain a 4-β-substituted benzomorpholine having the formula

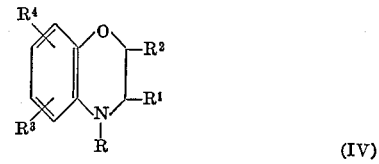

(IV)

At this point, (IV) may be treated in a variety of manners to introduce a particular group in the 4-β-position. For example, (III) may initially be treated with ethylene oxide to obtain a 4-β-hydroxyethyl group which may be subsequently treated to produce a 4-β-chloroethyl group, etc.

(c) reacting (IV) with POCl$_3$ in dimethylformamide or the like to obtain the aldehyde-substituted derivative having the formula

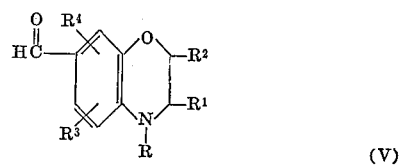

(V)

and (d) reacting (V) with a lower, saturated aliphatic dicarboxylic acid derivative having the formula Z—R—CN to obtain the dye of Formula I. In steps (a) through (d), above, R, $R^1$, $R^2$, $R^3$, $R^4$ and Z are the same as defined in Formula I.

The methine dyes of the invention can be used for dyeing textile materials, including natural and synthetic fibers, yarns and fabrics, giving fast yellow dyeings when applied thereto by conventional dye methods. The dyes display excellent light and sublimation fastness and, in general, exhibit superior fastness to washing and gas (atmospheric fumes).

The following examples will serve to further illustrate the preparation of representative intermediates and methine compounds of the invention.

EXAMPLE 1

A. Preparation of 3,6-dimethylbenzomorpholine

An amount of 209 g. 2-nitro-4-methylphenoxyacetone in 220 cc. absolute ethanol was reduced over Raney Ni at 1700–1800 p.s.i. hydrogen pressure with temperature raised over 2 hours to 167° C. The solution was cooled, filtered, and distilled to yield 104 g. of the benzomorpholine, B.P. 95–98° C./2 mm. It has the structure:

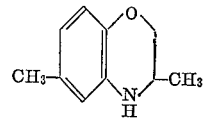

B. Preparation of 4-(β-hydroxyethyl)-3,6-dimethylbenzomorpholine

An amount of 20 g. 3,6-dimethylbenzomorpholine and 6.2 g. ethylene oxide in 20 cc. ethanol was heated at 180° C. for 10 hours. Fractional distillation in vacuo gave 23.5 g., B.P. 144–146° C./1 mm. The compound has the structure:

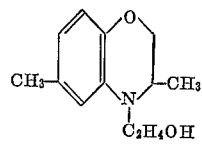

C. Preparation of 4-(β-phenylurethane)-3,6-dimethylbenzomorpholine

An amount of 2.07 g. 4-(β-hydroxyethyl)-3,6-dimethylbenzomorpholine, 1.19 g. phenyl isocyanate, and 10 cc. benzene was heated on a steam bath for 2 hours. The benzene was stripped off. The yield was quantitative. The compound has the structure:

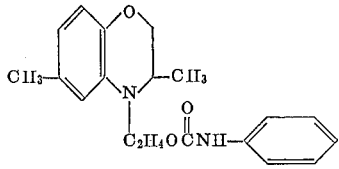

D. Preparation of the 7-aldehyde of step C

An amount of 3.26 g. of the intermediate from (C), above, was dissolved in 5 cc. dry dimethyl formamide. The solution was cooled and 2 cc. POCl$_3$ was added below 25° C. When addition was complete, the reaction was heated 1 hour on the steam bath. It was then poured onto about 100 cc. ice-water mixture. On basification with 50% aqueous sodium hydroxide solution the sticky yellow product separated, which solidified on standing. It has the structure:

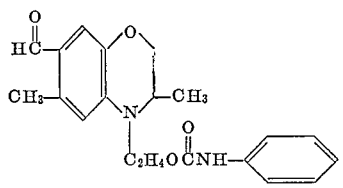

E. Preparation of the dye

An amount of 1.3 g. of the product from (D) above, 0.33 g. malononitrile, 5 drops piperidine, and 10 cc. of ethanol was refluxed 1 hour. The product separated out as a solid on chilling. It was collected by filtration and dried. The product melted at 118–124°. It dyes Dacron and Kodel polyesters and cellulose acetate in bright yellow shades of outstanding fastness properties and has the structure:

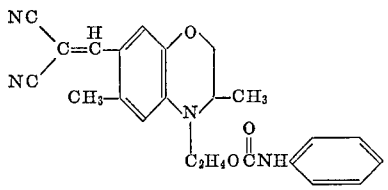

EXAMPLE 2

In this example the initial hydrogenation/cyclization step and the preparation of the 4-β-hydroxyethyl derivative have been omitted.

A. Preparation of 4-(β-chloroethyl)-3,6-dimethyl-benzomorpholine-7-aldehyde

An amount of 10.4 g. 4-(β-hydroxyethyl)-3,6-dimethyl-benzomorpholine was dissolved in 20 cc. dimethyl formamide. This solution was cooled and 10 cc. POCl$_3$ was added below 25° C. The reaction was heated on the steam bath 1.5 hr. after addition was complete. It was then drowned in a mixture of ice and water and the mixture was made basic with aqueous sodium hydroxide. The product precipitated as a sticky mass. The water was decanted and the residue recrystallized from 30 cc. ethanol. Yield—8.3 g., M.P. 92–94.5° C.

B. Preparation of the dye

An amount of 1.27 g. of the aldehyde from (A) above, 0.33 g. malononitrile, 3 drops piperidine, and 10 cc. ethanol was refluxed 1 hour, then allowed to cool to room temperature. The dye precipitated as a yellow solid which was filtered off and dried. It dyes polyester fibers, cellulose acetate, and Verel modacrylic bright yellow shades of excellent fastness. The dye has the structure:

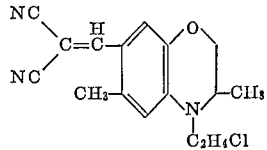

EXAMPLE 3

In this example, the initial hydrogenation/cyclization step and the preparation of the 4-β-hydroxyethyl derivative have been omitted.

A. Preparation of 4-(β-urethanyl)-3,6-dimethyl-benzomorpholine

An amount of 2.07 g. 4-(β-hydroxyethyl)-3,6-dimethyl-benzomorpholine, 0.99 g. n-butylisocyanate, 1 drop tri-n-butylamine, and 10 ml. dry benzene was heated on steam bath for 2 hr. The benzene was removed under vacuum. The yield was quantitative.

B. Preparation of 4-(β-n-butylurethanyl)-3,6-dimethyl-benzomorpholine-7-aldehyde An amount of 3.06 g. of the n-butylcarbamic ethyl ester from A was dissolved in 5 cc. dry dimethylformamide. After cooling the solution, there was added 2 ml. POCl$_3$ below 25° C., and the reaction heated 1 hr. on steam bath. It was then poured onto about 100 ml. ice-water mixture. On making basic with 50% NaOH, the sticky product was obtained, which was washed by decantation.

C. Preparation of the dye

The aldehyde from B was dissolved in 15 cc. ethanol. There were added to this solution 0.66 g. malolonitrile and 5 drops piperidine. After stirring and refluxing for 1 hr., the reaction was allowed to cool and the yellow product was collected by filtration and air dried. It dyes cellulose acetate and polyester fibers bright yellow shades and has the structure:

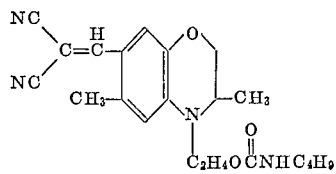

EXAMPLE 4

In this example the initial hydrogenation/crystalization step has been omitted.

A. Preparation of 4-(β-cyanoethyl)-3,6-dimethylbenzomorpholine

An amount of 163 g. 3,6-dimethylbenzomorpholine, 58.3 g. acrylonitrile, and 15 cc. glacial acetic acid was heated at about 150° C. for 8 hr. in a stainless steel autoclave. The product was distilled under vacuum.

B. Preparation of 4-(β-cyanoethyl)-3,6-dimethylbenzomorpholine-7-aldehyde

An amount of 2.16 g. 4-(2-cyanoethyl)-3,6-dimethyl-benzomorpholine was reacted with 5 cc. dry dimethylformamide and 2 cc. phosphorous oxychloride as described in Example 1(D) above. The aldehyde was obtained in good yield.

C. Preparation of the dye

An amount of 2.4 g. of the product from B, 0.66 g. malononitrile, 5 drops piperidine, and 15 ml. ethanol was refluxed for 1 hr. The product separated on chilling. It was collected by filtration and air dried. It dyes Dacron and Kodel polyesters, cellulose acetate, and Verel modacrylic bright yellow shades and has the following structure:

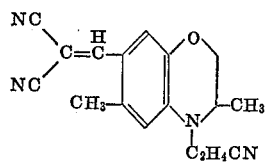

EXAMPLE 5

In this example, the initial hydrogenation/cyclization step and the preparation of the 4-β-hydroxyethyl derivative have been omitted.

A. Preparation of 4-(β-succinimidoethyl)-3,6-dimethyl-benzomorpholine

An amount of 22.5 g. 4-(β-chloroethyl)-3,6-dimethyl-benzomorpholine, 9.9 g. succinimide, 13.8 g. potassium carbonate, and 100 ml. dimethylformamide was refluxed for 1½ hr. The reaction mixture was drowned into water. The white solid was collected by filtration, washed with water and air dried.

B. Preparation of 4-(β-succinimidoethyl)-3,6-dimethyl-benzomorpholine-7-aldehyde An amount of 2.8 g. of the product from A was reacted with 5 ml. of dry dimethylformamide plus 2 ml. phosphorous oxychloride as described in Example 1(D) above. The sticky product was obtained which crystallized on standing.

C. Preparation of the dye

An amount of 1.58 g. of the aldehyde from B, 0.33 g. malononitrile, 5 drops piperidine, and 10 ml. ethanol was refluxed for 1 hr. The reaction mixture was allowed to cool and the dye collected by filtration. It dyes polyester fibers bright shades of yellow having excellent light and sublimation fastness. The dye has the structure:

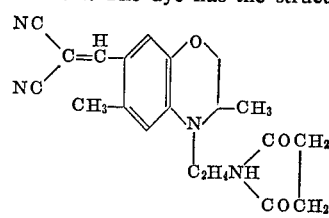

In the following table, further examples of dyes prepared in accordance with the procedures of Examples 1 through 5 are illustrated. The column headings in the table correspond to R, $R^1$, $R^2$, $R^3$, $R^4$ and Z of Formula I, above.

TABLE

| Example No. | R | $R^1$ | $R^2$ | $R^3$ | $R^4$ | Z |
|---|---|---|---|---|---|---|
| 6 | —CH₂CH₂CN | —CH₃ | H | 6-CH₃ | H | —CN |
| 7 | —CH₂CH₂OC(O)NHC₆H₅ | —CH₃ | H | 6-CH₃ | H | —CO₂CH₃ |
| 8 | —CH₂CH₂OC(O)NHC₆H₅ | —CH₃ | H | 6-CH₃ | H | —CO₂CH₂CH₂CN |
| 9 | —CH₂CH₂OC(O)NHC₆H₅ | —CH₃ | H | 6-CH₃ | H | —CONH₂ |
| 10 | —CH₂CH₂OC(O)HNC₆H₅ | —CH₃ | H | H | H | —CN |
| 11 | —CH₂CH₂OC(O)NHC₆H₅ | H | H | 6-CH₃ | H | —CN |
| 12 | —CH₂CH₂OC(O)NHC₆H₅ | —CH₃ | H | 5-CH₃ | 8-CH₃ | —CN |
| 13 | —CH₂CH₂OC(O)NHC₆H₅ | —C₆H₅ | H | 6-CH₃ | H | —CN |
| 14 | —CH₂CH₂OC(O)NHC₄H₉ | —CH₃ | H | 6-CH₃ | H | —CN |
| 15 | —CH₂CH₂OC(O)NHCH₂CO₂C₂H₅ | —CH₃ | H | 6-CH₃ | H | —CN |
| 16 | —CH₂CH₂OC(O)CH₃ | —CH₃ | H | 6-CH₃ | H | —CN |
| 17 | —CH₂CH₂NHC(O)NHC₆H₅ | —CH₃ | H | 6-CH₃ | H | —CN |
| 18 | —CH₂CH₂NHC(O)CH₃ | —CH₃ | H | 6-CH₃ | H | —CN |
| 19 | —CH₂CH₂N(succinimido-dimethyl) | —CH₃ | H | 6-CH₃ | H | —CN |
| 20 | —(CH₂)₃OC(O)NHC₆H₅ | —CH₃ | H | 6-CH₃ | H | —CN |
| 21 | —CH₂CH₂OC(O)NHC₆H₅ | —CH₃ | H | 6-OCH₃ | H | —CN |
| 22 | —CH₂CH₂OC(O)NHC₆H₅ | —CH₃ | H | 6-NHCOCH₃ | H | —CN |

TABLE—Continued

| Example No. | R | R¹ | R² | R³ | R⁴ | Z |
|---|---|---|---|---|---|---|
| 23 | —CH$_2$CH$_2$OC(O)NHC$_6$H$_5$ | —CH$_3$ | H | 6-Cl | H | —CN |
| 24 | —CH$_2$CH$_2$OC(O)NHC$_6$H$_5$ | C$_2$H$_5$ | H | 5-OCH$_3$ | 8-CH$_3$ | —CN |
| 25 | —CH$_2$CH$_2$OC(O)NHC$_6$H$_5$ | —CH$_3$ | —CH$_3$ | 6-CH$_3$ | H | —CN |
| 26 | —CH$_2$CH$_2$OC(O)NHC$_6$H$_5$ | H | —CH$_3$ | 6-CH$_3$ | H | —CN |
| 27 | —CH(CH$_3$)CH$_2$CN | —CH$_3$ | H | 6-CH$_3$ | H | —CN |
| 28 | —CH$_2$CH$_2$NHC(O)OC$_2$H$_5$ | —CH$_3$ | H | 6-CH$_3$ | H | —CH |
| 29 | —CH$_2$CH$_2$NHSO$_2$CH$_3$ | —CH$_3$ | H | 6-CH$_3$ | H | —CN |
| 30 | —C$_4$H$_9$ | —CH$_3$ | H | 6-CH$_3$ | H | —CN |
| 31 | —CH$_2$CH$_2$OCH$_3$ | —CH$_3$ | H | 6-CH$_3$ | H | —CN |
| 32 | —CH$_2$CH$_2$CH$_2$N(succinimido) | —CH$_3$ | H | 6-CH$_3$ | H | —CN |

As described above, the novel methine dyes of this invention possess a characteristically distinct structure. This distinctive structure imparts unexpected properties to the present compounds, especially when they are used for dyeing textiles.

Thus, the methine dyes of this invention, in general, can be expected to be superior to similar dyes when tested by methods such as described in the A.A.T.C.C. Technical Manual, 1964 edition, depending in part upon the particular dye used and the fiber being dyed.

The methine compounds of the invention may be used for dyeing hydrophobic fibers such as linear polyester, cellulose ester, modacrylic, etc., fibers in the manner described in U.S. Patents 2,880,050, 2,757,064, 2,782,187 and 2,043,827. The following examples illustrate methods by which the methine compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the methine compounds into the spinning dope and spinning the fiber as usual. The methine compounds of the invention have varying utility as dyes. The degree of utility varies, for example, depending upon the material being dyed and the formula of the methine compound. Thus, for example, all the dyes will not have the same degree of utility for the same material. It is of course understood that the substituents on the R, R¹, R², R³, R⁴ and vinyl radicals serve primarily as auxochrome groups to control the color of the methine compound.

Polymeric linear polyester materials of the terephthalate type are illustrative of the linear aromatic polyester textile materials that can be dyed with the new methine compounds of our invention. The terephthalate fibers sold under the trademarks "Kodel," "Dacron," and "Tereylene," for example, in the form of filaments, yarn and fabric, for example, are illustrative of the polyester textile materials that can be dyed. The linear aromatic polyester materials specifically named have a melting point of at least 200° C.

Nylon, in fiber, yarn and fabric form, is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove and as defined in the appended claims.

What we claim is:

1. A water-insoluble methine compound having the formula

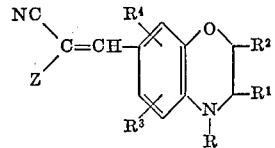

wherein

R represents lower alkyl, or lower alkyl substituted with halogen, cyano, lower alkoxy, phenylcarbamoyloxy, lower alkylcarbamoyloxy,

—OOCNHCH$_2$COOC$_2$H$_5$, —NHCOOC$_2$H$_5$ lower alkanoyloxy, phenylureido, lower alkanoylamido, succinimido, or lower alkylsulfonamido;

R¹ represents hydrogen, lower alkyl, phenyl, or lower alkylphenyl;

R² represents hydrogen or lower alkyl;

R³ and R⁴ are the same or different and each represents hydrogen, lower alkyl, lower alkoxy, halogen, or lower alkanoylamido; and Z represents cyano, —COOCH$_2$CH$_2$CN, a lower —COO-alkyl, —CONH$_2$, or lower —CON(alkyl)$_2$.

2. A compound according to claim 1 wherein

R represents lower alkyl substituted with lower alkylcarbamoyloxy, phenylcarbamoyloxy, halogen, cyano, or succinimido;

$R^1$, $R^2$, $R^3$ and $R^4$ each represents hydrogen or methyl; and

Z represents cyano, —COOCH$_2$CH$_2$CN, lower —COO-alkyl, or —CONH$_2$.

3. A compound according to claim 1 having the formula

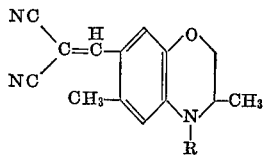

wherein R is 2-phenylcarbamoyloxyethyl, 2-chloroethyl, 2-butylcarbamoyloxyethyl, 2-cyanoethyl, or 2-succinimidoethyl.

References Cited
FOREIGN PATENTS
1,429,328   1/1966   France.

OTHER REFERENCES
Chem. Abst. vol. 63, column 16361 (Dec. 6, 1965).

HENRY R. JILES, *Primary Examiner.*

NATALIE TROUSOF, *Assistant Examiner.*

U.S. Cl. X.R.

8—54, 55, 57, 58; 260—590